United States Patent [19]
Gupta

[11] Patent Number: 6,143,351
[45] Date of Patent: Nov. 7, 2000

[54] CONTINUOUS PRODUCTION OF GELATINOUS PRODUCTS

[76] Inventor: Rajendra P. Gupta, 9 Veery Lane, Gloucester, Ontario, Canada, K1J 8X4

[21] Appl. No.: 08/964,395

[22] Filed: Nov. 6, 1997

[51] Int. Cl.[7] ........................................................ A23L 1/20
[52] U.S. Cl. .......................... 426/634; 426/422; 426/516; 426/495
[58] Field of Search ................................... 426/634, 422, 426/516, 495

[56] References Cited

U.S. PATENT DOCUMENTS 5,094,875   3/1992   Chen ........................................ 426/634

OTHER PUBLICATIONS

"Production and yield of whole–milk Ricotta manufactured by a continuous process. 1. Materials and methods" by H. W. Modler and D.B. Emmons, Milchwissenschaft, vol. 44 (11), pp. 673–738, 1989).

Tofu & Soymilk Production, The Book of Tofu, vol. 2., p. 148. Authors: Shurtleff et al., 1985.

*Primary Examiner*—Anthony J. Weier

[57] ABSTRACT

A continuous production of gelatinous products by coagulation of such material as soymilk is described. There is significant variation of quality of product dependent on the human factors. Soymilk and a coagulant are transported through a holding tube at a preset rate so that a mixture of soymilk and coagulant remain in the holding tube for a predetermined period of time to effect coagulation. A perforated vertical tubing is used for separating gelatinous product from liquid and pressing it by its own weight.

7 Claims, 1 Drawing Sheet

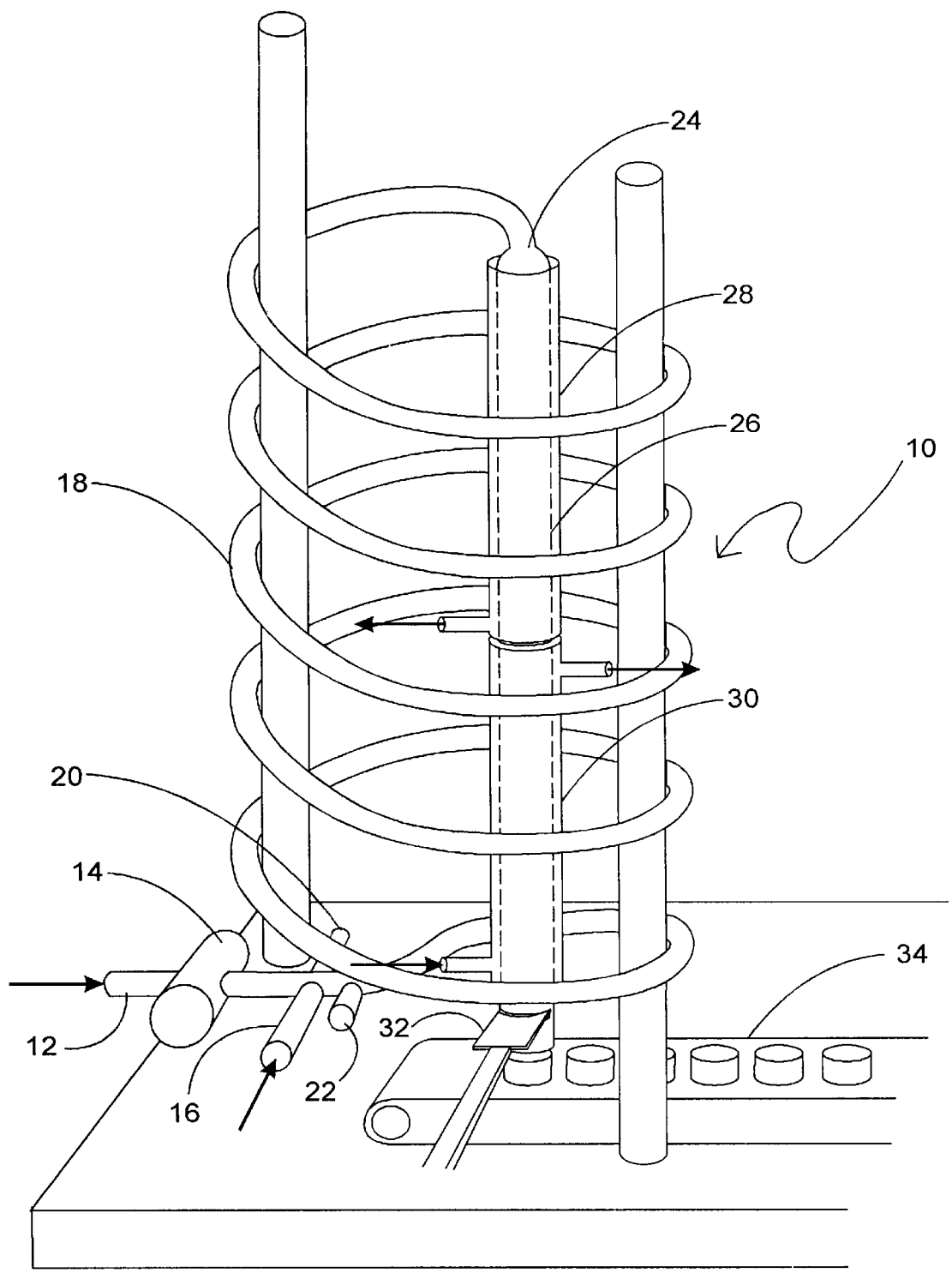

ns product by coagulating milk. The process comprises steps of transporting a heated mixture of milk and a coagulant through a length of a holding tube at a preset rate so that coagulation proceeds over a predetermined period of time to form the gelatinous product, gravity-feeding the gelatinous product through a perforated vertical tubing to separate from liquid and pressing the gelatinous product under its own weight.

CONTINUOUS PRODUCTION OF GELATINOUS PRODUCTS

FIELD OF THE INVENTION

The invention generally relates to production of soybean products. In particular it is directed to a process of and apparatus for continuous production of gelatinous soybean products such as tofu etc.

BACKGROUND OF THE INVENTION

Tofu making is a labor intensive process and is prone to microbial contamination at various stages. There is significant variation of quality of product dependent on the human factors.

Batch curding of hot soymilk is done by adding a coagulant followed by gentle mixing, waiting, again gentle mixing and further waiting until the curd forms and separates from whey. The curd is then gently drained off whey and ladled into filter fabric lined forming boxes and the curd pressed by the application of mechanical force until it acquires the desired firmness. It is then cut into blocks which are then sold in bulk or package in water filled plastic tubs or vacuum packed. Each step is either performed manually or semi-automatically and has significant exposure to bacteria and requires human input.

In U.S. Pat. No. 5,094,975 Mar. 10, 1992 Chen, a continuous method of tofu production is described. The method comprises steps of simultaneously feeding substantially constant proportion of soymilk and an aqueous coagulant solution into a coagulator vessel; coagulating the soymilk and aqueous coagulant solution at an elevated temperature to obtain a gelatinous mixture comprising soybean curd lumps and whey; prior to substantial cooling of the gelatinous mixture after coagulation, separating at least a portion of the whey from the gelatinous mixture. The equipment described in the patent uses a coagulating vessel in which coagulation takes place and gelatinous products are transported to a washer. The coagulating vessel is not a length of holding tube in which materials travel at a constant rate while coagulation process is taking place.

A prior art method also exists for continuous curding of milk and whey milk for making ricotta cheese as described in "Production and yield of whole-milk Ricotta manufactured by a continuous process. 1. Materials and methods" by H. W. Modler and D. B. Emmons, Milchwissenschaft, Vol. 44 (11), pp 673–676, 1989.

However, it does not provide for the remaining steps in the process of making tofu and also does not give the operating parameters for curding soymilk. The Reynolds number based process description of the prior art is inadequate for the scaling of the process to industrial size operations even for ricotta cheese production.

The present invention addresses these problems and enables the continuous production of gelatinous soybean products such as tofu.

OBJECTS OF THE INVENTION

It is therefore an object of the invention to provide a method of and apparatus for continuously producing gelatinous soybean products.

It is another object of the invention to provide a method of and apparatus for continuously producing gelatinous soybean products which can be scaled up and/or down easily.

SUMMARY OF THE INVENTION

Briefly described, according to one aspect, the invention is directed to a process of continuously producing a gelatinous product by coagulating milk. The process comprises steps of transporting a heated mixture of milk and a coagulant through a length of a holding tube at a preset rate so that coagulation proceeds over a predetermined period of time to form the gelatinous product, gravity-feeding the gelatinous product through a perforated vertical tubing to separate from liquid and pressing the gelatinous product under its own weight.

According to another aspect, the invention relates to an apparatus for carrying out such a continuous process of producing gelatinous products. The apparatus includes a holding tube for continuously transporting the milk, the holding tube having an inlet for feeding milk and an outlet for removing a coagulated product and an injector port near the inlet of the holding tube for injecting a controlled amount of a coagulant into the holding tube. The apparatus further includes a pump near the inlet of the holding tube for transporting the milk at a preset rate which is governed by the length of the holding tube and a desired duration of milk's stay in the holding tube, a vertical perforated tubing connected at its upper end to the outlet of the holding tube, the diameter of the vertical tubing being larger than that of the holding tube, and an outer jacket covering a lower part of the vertical perforated tubing for passing water for controlling the temperature of the gelatinous product in the holding tube.

BRIEF DESCRIPTION OF THE DRAWING

A sole FIGURE is a schematic illustration of an apparatus for continuously producing gelatinous soybean products according to one embodiment of the invention.

DETAILED DESCRIPTION OF THE PREFERRED EMBODIMENTS OF THE INVENTION

The current inventions eliminates soymilk and curd exposure to air and human hands all through the curding, draining, forming, pressing, cooling, and cutting steps and provides tofu blocks ready to package. The sole accompanying FIGURE illustrates schematically a continuous tofu production apparatus 10 according to one embodiment of the invention. In the FIGURE, hot soymilk at a temperature ranging from 40° C. to 90° C., preferably between 60° C. and 80° C., dependent upon the coagulant used and the end product desired, is fed at 12 and pumped by a pump 14 at a controlled rate and a liquid coagulant is injected at 16 and mixed with the soymilk, and the mixture moves at a low flow rate through a holding tube 18 at a velocity ranging from 1 mm/s to 100 mm/s or more, but preferably from 5 mm/s to 25 mm/s. A temperature sensor 20 and a PH meter 22 may be provided as shown. According to the present invention the flow is primarily determined by velocity of the fluid controlled by the pump and not by Reynolds number parameter used in the prior art. The flow velocity may be constant or vacillating or pulse modulated for obtaining optimum curding of soymilk.

The holding tube length is chosen to provide the desired holding time in the range of few minutes to 30 minutes or more at the desired velocity, and the diameter is chosen to provide the desired throughput. The holding tube may be insulated if temperature loss is significant, especially in small diameter systems. In fact some temperature drop is quite acceptable. Reasonable length is found to be 10 m to 100 m and reasonable diameter is found to be 15 mm to 150 mm for the formation of good curd.

By the title the mixture reaches the exit end 24 of the holding tube, it forms into curd lumps dispersed in the whey.

In the FIGURE, the holding tube 18 is coiled in oval but other patterns e.g., circular, racetrack, serpentine, or other compact geometrical configurations are possible such that the exit end of the tube is high enough to connect it to the following stage where the curd is drained off whey, formed, and cooled. The curd-whey from the holding tube is sent downward through a perforated vertical tubing 26 with coaxial outer shell 28 provided with outlets for draining the whey. The whey is removed at a controlled rate and the curd presses under its own weight as it progresses downward in the perforated tube. The lower section of the perforated tube is provided with a separate outer shell 30 through which cold water flows which cools the formed curd and removes solubles. Finally, a cutter blade 32 cuts the formed curd in the desired length and the resulting tofu block drops out from the machine onto e.g., a conveyor belt 34 and is sent for packaging. Alternatively, the cut blocks may be dropped directly into packaging containers, optionally filled with water or another liquid, and sealed to complete the packaging. The perforated tube diameter is usually larger than the holding tube diameter by a factor of two, especially for small diameter holding tubes, to keep the height of the equipment reasonable and to yield pressed curd blocks of desired dimensions.

The holding tube and the perforated tube may also be non circular, e.g., rectangular, square, elliptical, etc. The coagulants used include $CaCl_2$, $MgCl_2$, $CaCO_3$, acetic acid, GDL (glucono delta-lactone), and a mixture of the foregoing. The coagulant injected is usually in the range of 1% to 3% of the soybean used in making soymilk.

The invention provides also proper process parameters for curding soymilk as well as dairy milk which enable scaling of the process to suit all sizes of production equipment.

What is claimed is:

1. A process of continuously producing a gelatinous product by coagulating milk comprising steps of:

transporting a heated mixture of milk and a coagulant through a length of a holding tube at a preset velocity to perform coagulation over a predetermined period of time so that curd lumps dispersed in whey are formed when the mixture reaches an exit end of the holding tube;

feeding the curd lumps dispersed in whey through a perforated vertical tubing to separate the curd lumps from the whey;

pressing the curd lumps under its own weight and removing the pressed curd lumps at the bottom of the perforated vertical tubing.

2. The process of continuously producing a gelatinous product by coagulating milk according to claim 1 comprising further steps of:

pumping a heated milk through a length of a holding tube at a preset velocity so that the milk remains in the holding tube for a predetermined period of time; and injecting a coagulant into the holding tube at one end thereof to uniformly mix with the milk.

3. The process of continuously producing a gelatinous product by coagulating milk according to claim 1 comprising a further step of:

forming the gelatinous product into a desired size and shape.

4. The process of continuously producing a gelatinous product by coagulating milk according to claim 3 wherein the holding tube is in a vertical helix and the process comprises a further step of pumping a heated milk from near the bottom of the vertical helix.

5. The process of continuously producing a gelatinous product by coagulating milk according to claim 1 wherein the milk is soymilk and the gelatinous product is tofu.

6. The process of continuously producing a gelatinous product by coagulating milk according to claim 2 wherein the milk is soymilk and the gelatinous product is tofu.

7. The process of continuously producing a gelatinous product by coagulating milk according to claim 4 wherein the milk is soymilk and the gelatinous product is tofu.

* * * * *